United States Patent [19]

Custer

[11] Patent Number: 5,404,920
[45] Date of Patent: Apr. 11, 1995

[54] AUTOMATED FLUID CHARGING APPARATUS

[76] Inventor: Joseph L. Custer, 321 N. Morgan St., Rushville, Ind. 46173

[21] Appl. No.: 136,012

[22] Filed: Oct. 15, 1993

[51] Int. Cl.$^6$ .................... B65B 1/30; B65B 3/26
[52] U.S. Cl. ........................ 141/83; 141/94; 141/198; 222/249; 222/266
[58] Field of Search .............. 141/83, 94, 95, 192, 141/198, 81, 367; 222/249, 252, 253, 254, 265, 266, 275, 278

[56] References Cited

U.S. PATENT DOCUMENTS

| | | | |
|---|---|---|---|
| 2,998,164 | 8/1961 | Clements | 222/275 |
| 4,060,178 | 11/1977 | Miller | 222/266 |
| 4,840,064 | 6/1989 | Fudim | 73/290 R |
| 4,966,206 | 10/1990 | Baumann et al. | 141/79 |
| 5,072,649 | 12/1991 | Laghi | 91/171 |
| 5,083,591 | 1/1992 | Edwards et al. | 141/83 |
| 5,133,391 | 7/1992 | Johansson et al. | 141/9 |

*Primary Examiner*—Renee S. Luebke
*Assistant Examiner*—Steven O. Douglas

*Attorney, Agent, or Firm*—Robert A. Shack; David L. Baker; Rhodes & Ascolillo

[57] ABSTRACT

A fluid charging system for charging each of a succession of components with a weight of a fluid, each of the components being charged with a respective selected fluid weight selected from a plurality of fluid weights, the fluid charging system including a scale for weighing each of the components and for generating weight signals indicative of the weight of each of the components, an identification mechanism for generating identification signals identifying each of the components, a pumping system for charging each of the components with the respective selected fluid weight by delivering the respective selected fluid weights to the components, and a digital processing mechanism for receiving the weight signals and the identification signals, for determining the respective selected fluid weight for each of the components from the plurality of fluid weights, and for actuating the pumping system to thereby cause the pumping system to deliver the respective selected fluid weights to the components.

15 Claims, 3 Drawing Sheets

AUTOMATED FLUID CHARGING APPARATUS

BACKGROUND

1. Field of the Invention

The present invention relates to the field of filling apparatuses, even more particularly to fluid charging apparatuses that dispense predetermined weights of a fluid, most particularly a lubricating fluid, such as, for example, oil and the like.

2. Description of the Related Art

U.S. Pat. No. 5,133,391 relates to a method and arrangement for accurately injecting a preset proportion of an additive into an oil product when the oil product is being loaded into an oil tank truck at a truck farm or the like U.S. Pat. No. 4,966,206 relates to a device for filling a container with a gaseous fuel such as natural gas that adjusts the filling pressure of the gaseous fuel to the local ambient temperature.

U.S. Pat. No. 4,840,064 relates to a liquid volume monitoring apparatus and method, particularly advantageous for determining the volume of liquid in a liquid reservoir of an integrated drive generator of an aircraft engine, wherein the ullage volume of a container having an inflow and an outflow is determined by interrupting one of the inflow and the outflow and detecting the pressure of the gas in the ullage volume, from which a microprocessor calculates the volume of liquid in the container during the interruption from the detected change in pressure of the gas.

SUMMARY OF THE INVENTION

Various modern manufacturing operations require the repetitive filling of components with a liquid. One such operation is the original manufacturing (or remanufacturing) of compressors, wherein each compressor is normally filled to an appropriate level with a lubricating oil at or near the completion of the process. Previously employed methods have required an operator to independently measure the appropriate volume (or weight) of oil into each completed component (e.g., each compressor).

Moreover, the problem is exacerbated whenever a number of various makes and/or models of components are being simultaneously produced or remanufactured. For example, in a compressor remanufacturing operation, a number of various makes and models of compressors may require filling with different volumes of lubricating oil, depending upon the particular make and/or model of compressor. Even further, if different types of lubricating oil (e.g., different viscosities) are required for different compressors, the process of choosing the correct fluid for each component and simultaneously assuring that the correct volume of that fluid is added becomes even more complicated.

Since this process is usually carried out by human operators in a repetitive fashion, the chances for error are clearly ever present.

Accordingly, one object of the present invention is the provision of an automated fluid charging apparatus for charging components with varying selected weights (or volumes) of a fluid, such as a lubricating oil, wherein the chances of one of the components receiving an incorrect fluid charge are significantly reduced.

Another object of the present invention is the provision of such a automated fluid charging apparatus in which the fluid charging operations are controlled by a digital processing control unit.

Yet another object of the invention is the provision of an automated fluid charging apparatus that reduces the number of decisions that are required from the operator of the apparatus.

A still further object of the invention is the provision of such an automated fluid charging apparatus in which the pumping of the fluid (e.g., lubricating oil) is carried out by a unique arrangement of positive displacement cylinders and flow control solenoids.

In one aspect, the invention generally features a fluid charging system for charging each of a succession of components with a weight of a fluid, each of the components being charged with a respective selected fluid weight selected from a plurality of fluid weights, the fluid charging system including: a scale for weighing each of the components and for generating weight signals indicative of the weight of each of the components; an identification mechanism for generating identification signals identifying each of the components; a pumping system for charging each of the components with the respective selected fluid weight by delivering the respective selected fluid weights to the components; and a digital processing mechanism for receiving the weight signals and the identification signals, for determining the respective selected fluid weight for each of the components from the plurality of fluid weights, and for actuating the pumping system to thereby cause the pumping system to deliver the respective selected fluid weights to the components.

Preferably, the pumping system includes a plurality of positive displacement cylinders of substantially differing and distinct capacities, and the digital processing mechanism includes a mechanism for selectively actuating selected ones of the plurality of positive displacement cylinders to thereby deliver the respective selected fluid weights to the components.

In another aspect, the invention features a fluid charging system for charging each of a succession of components with a weight of a fluid, each of the components being charged with a respective selected fluid weight selected from a plurality of fluid weights, the fluid charging system including: a scale for weighing each of the components and for generating weight signals indicative of the weight of each of the components; an identification mechanism for generating identification signals identifying each of the components; a pumping system for charging each of the components with the respective selected fluid weight by delivering the respective selected fluid weights to the components, the pumping system including: a plurality of positive displacement cylinders of substantially differing and distinct capacities; each of the plurality of positive displacement cylinders including a double acting positive displacement cylinder having a reciprocating piston member executing a first stroke and a substantially reciprocal second stroke, the reciprocating piston member being operative to deliver the fluid to the components during both of the first stroke and the substantially reciprocal second stroke; and a plurality of double acting two way solenoids, one each of the double acting two way solenoids being connected to one each of the double acting positive displacement cylinders, each of the double acting two way solenoids having a first fluid flow path and a second fluid flow path, the first and second flow paths being substantially reciprocal to one another; and digital processing mechanism for receiving the weight signals and the identification signals and for determining the respective selected fluid weight for each of the components from the plurality of fluid weights; the digital processing mechanism including a mechanism for selectively actuating selected ones of the plurality of positive displacement cylinders to thereby produce the respective selected fluid weights.

Preferably, the pumping system additionally comprises a fluid reservoir mechanism for supplying a flow of the fluid to the plurality of double acting two way solenoids, a fluid discharge mechanism for delivering the respective selected fluid weights from the plurality of double acting two way solenoids to the components; and a pressure regulation mechanism for maintaining a substantially constant pressure in the fluid supplied from the fluid reservoir mechanism to the plurality of double acting two way solenoids; the fluid charging system additionally comprises a conveyor mechanism passing across the scale and defining a scale entrance area and a scale exit area, a first photosensor mechanism positioned adjacent the scale entrance area, the first photosensor mechanism transmitting a first photosensor signal to the digital processing mechanism indicative that a component has passed the scale entrance area on the conveyor mechanism, a second photosensor mechanism positioned adjacent the scale exit area, the second photosensor mechanism transmitting a second photosensor signal to the digital processing mechanism indicative that a component has passed the scale exit area on the conveyor mechanism, a scale entrance gate positioned at the scale entrance area and operable between open and closed positions, and a scale exit gate positioned at the scale exit gate area and operable between open and closed positions, and the digital processing mechanism additionally includes a mechanism for operating the scale entrance and exit gates responsive to the first and second photosensor signals; the identification mechanism includes a control panel having data entry mechanism operable by an operator to generate the identification signals; the identification mechanism includes a bar code reader; the plurality of positive displacement cylinders includes three positive displacement cylinders having displacement volumes of 1.1, 7.5, and 50 cubic inches; and each of the plurality of positive displacement cylinders is provided with adjustment mechanism for adjusting the displacement volume thereof.

In yet another aspect, the invention generally features a fluid charging system for charging each of a succession of components with a weight of a fluid, each of the components being charged with a respective selected fluid weight selected from a plurality of fluid weights, the fluid charging system including: a scale for weighing each of the components and for generating weight signals indicative of the weight of each of the components; an identification mechanism for generating identification signals identifying each of the components; a pumping system for charging each of the components with the respective selected fluid weight by delivering the respective selected fluid weights to the components, the pumping system including: a plurality of positive displacement cylinders of substantially differing and distinct capacities; each of the plurality of positive displacement cylinders including a double acting positive displacement cylinder having a reciprocating piston member executing a first stroke and a substantially reciprocal second stroke, the reciprocating piston member being operative to deliver the fluid to the components during both of the first stroke and the substantially reciprocal second stroke; and a plurality of double acting two way solenoids, one each of the double acting two way solenoids being connected to one each of the double acting positive displacement cylinders, each of the double acting two way solenoids having a first fluid flow path and a second fluid flow path, the first and second flow paths being substantially reciprocal to one another; each of the positive displacement cylinders including a piston cylinder, the reciprocating piston member being positioned within the piston cylinder, a first fluid passage disposed at a first end of the piston cylinder adjacent a first terminating point of the first stroke of the piston, the first fluid passage communicating with the connected double acting two way solenoid, and a second fluid passage disposed at a second end of the piston cylinder adjacent a second terminating point of the second reciprocal stroke of the piston, the second fluid passage also communicating with the connected double acting two way solenoid; a first pressure sensor positioned on the first fluid passage for detecting a first pressure pulse therein; and a second pressure sensor positioned on the second fluid passage for detecting a second pressure pulse therein; and a digital processing mechanism for receiving the weight signals and the identification signals and for determining the respective selected fluid weight for each of the components from the plurality of fluid weights; the digital processing mechanism including a mechanism for selectively actuating selected ones of the plurality of positive displacement cylinders to thereby produce the respective selected fluid weights, and a counting mechanism for counting the first and second pressure pulses.

Preferably, the pumping system additionally comprises a fluid reservoir mechanism for supplying a flow of the fluid to the plurality of double acting two way solenoids, a fluid discharge mechanism for delivering the respective selected fluid weights from the plurality of double acting two way solenoids to the components; and a pressure regulation mechanism for maintaining a substantially constant pressure in the fluid supplied from the fluid reservoir mechanism to the plurality of double acting two way solenoids; the fluid charging system additionally comprises a conveyor mechanism passing across the scale and defining a scale entrance area and a scale exit area, a first photosensor mechanism positioned adjacent the scale entrance area, the first photosensor mechanism transmitting a first photosensor signal to the digital processing mechanism indicative that a component has passed the scale entrance area on the conveyor mechanism, a second photosensor mechanism positioned adjacent the scale exit area, the second photosensor mechanism transmitting a second photosensor signal to the digital processing mechanism indicative that a component has passed the scale exit area on the conveyor mechanism, a scale entrance gate positioned at the scale entrance area and operable between open and closed positions, and a scale exit gate positioned at the scale exit gate area and operable between open and closed positions; and the digital processing mechanism additionally includes a mechanism for operating the scale entrance and exit gates responsive to the first and second photosensor signals; the identification mechanism includes a control panel having a data entry mechanism operable by an operator to generate the identification signals; the identification mechanism includes a bar code reader; the plurality of positive displacement cylinders includes three positive displacement cylinders having displacement volumes of 1.1, 7.5, and 50 cubic inches; and each of the plurality of positive displacement cylinders is provided with an adjustment mechanism for adjusting the displacement volume thereof.

The invention will now be described by way of a particularly preferred embodiment, reference being made to the accompanying drawings, wherein:

DESCRIPTION OF THE PREFERRED EMBODIMENT

Figure 1:
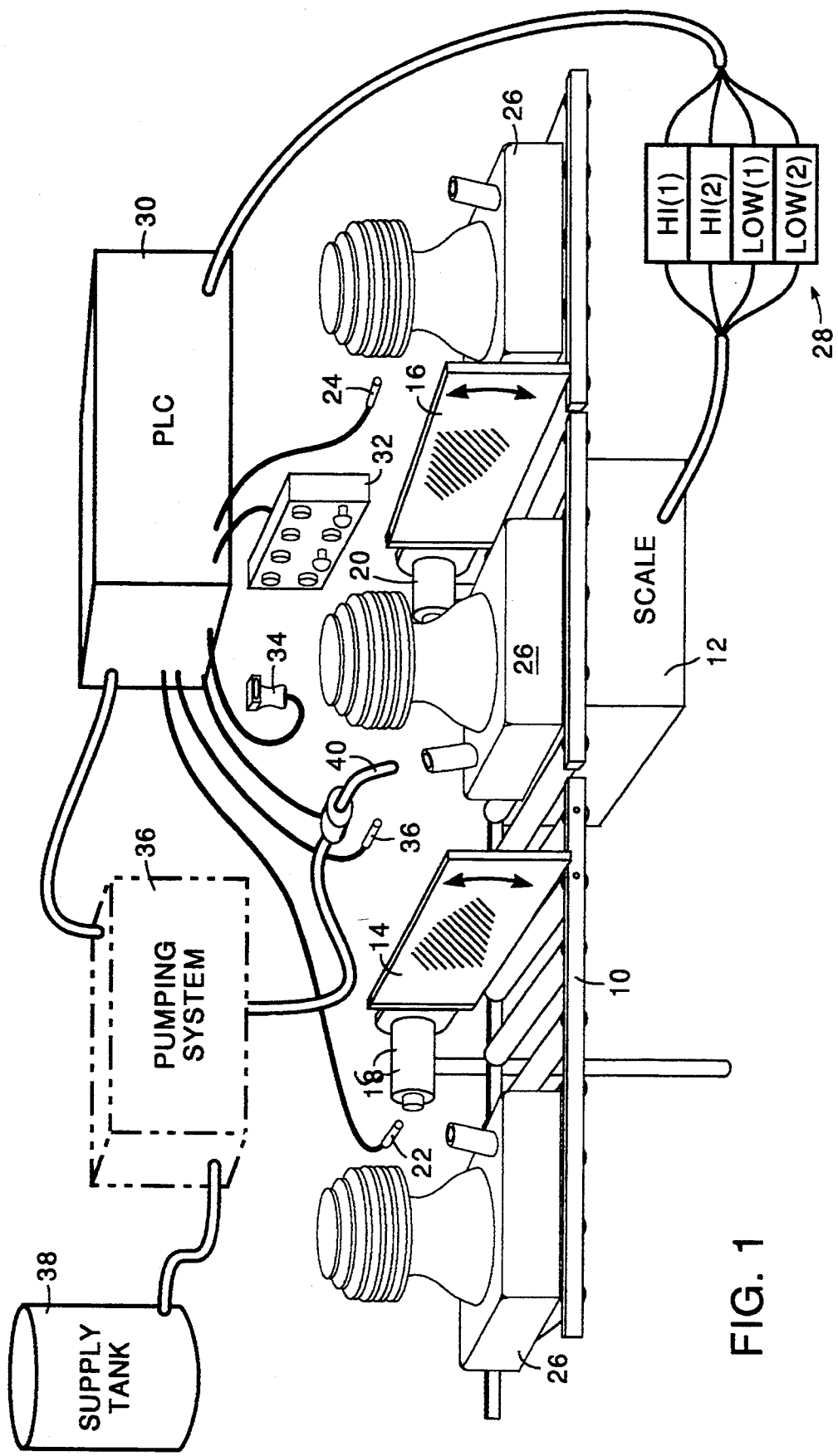
FIG. 1 is a perspective view of a weighing station and an operator control area of an automated fluid charging apparatus constructed according to the present invention.

Referring initially now to FIG. 1, an automated fluid charging apparatus constructed according to the present invention generally includes a roller bar type of conveyor 10 that passes through an area where an operator of the apparatus is stationed. A weight scale 12 is positioned along the conveyor 10 at the operator's area and is flanked by an entrance gate 14 and an exit gate 16. The entrance gate 14 and the exit gate 16 are each preferably actuated by associated servomotors 18, and 20, respectively. An entrance gate photosensor (or "photoeye") 22 is positioned adjacent the entrance gate 14, and a similar exit gate photosensor 24 is positioned adjacent the exit gate 16.

A number of components 26 (e.g., remanufactured compressors) that are to be charged with a fluid (e.g., lubricating oil) are positioned along the conveyor 10 such that they will pass over the scale 12 and there be weighed. The scale 12 is preferably of the type well known in the art that generates electrical signals indicative of the weight registered. Preferably, the weight indicative signals generated by the scale 12 are in digital format. Alternatively, any one of a number of well known analog to digital converters may be used to convert any analog weight indicative signals into digital form.

The weight indicative digital signals are provided through a cutoff module 28 having digital readouts to a programmable logic controller 30 (e.g., a digital processor). "Programmable logic controllers" are well known to those of ordinary skill in the art of automated manufacturing and include digital logic that can be easily programmed to respond to various conditions and to generate control signals for actuating servomotors and other components commonly employed in manufacturing processes. The programmable logic controller 30 additionally receives inputs from the entrance gate photosensor 22 and the exit gate photosensor 24, as well as from an operator control panel 32 that is provided with data entry apparatus (e.g., pushbuttons, switches, a keyboard, etc.) that allows the operator to enter information identifying the particular component 26 being charged at the time. Optionally, a bar code scanner or reader 34 may be provided to generate identification signals identifying the particular component 26. For example, each component 26 can be labeled with an identifying bar code label, and the operator is then only required to scan the bar code label, in order to enter the identifying data into the programmable logic controller 30. An additional photosensor 36 can also be provided immediately adjacent the scale 12, as shown, to indicate to the programmable logic controller 30 that a component 26 is currently on the scale 12.

In response to the data entered via the control panel 32 or the bar code reader 34, the programmable logic controller 30 actuates a pumping system 36, which receives fluid from a supply tank 38 and delivers the fluid into the various components 26 via a discharge nozzle 40.

Figure 2:
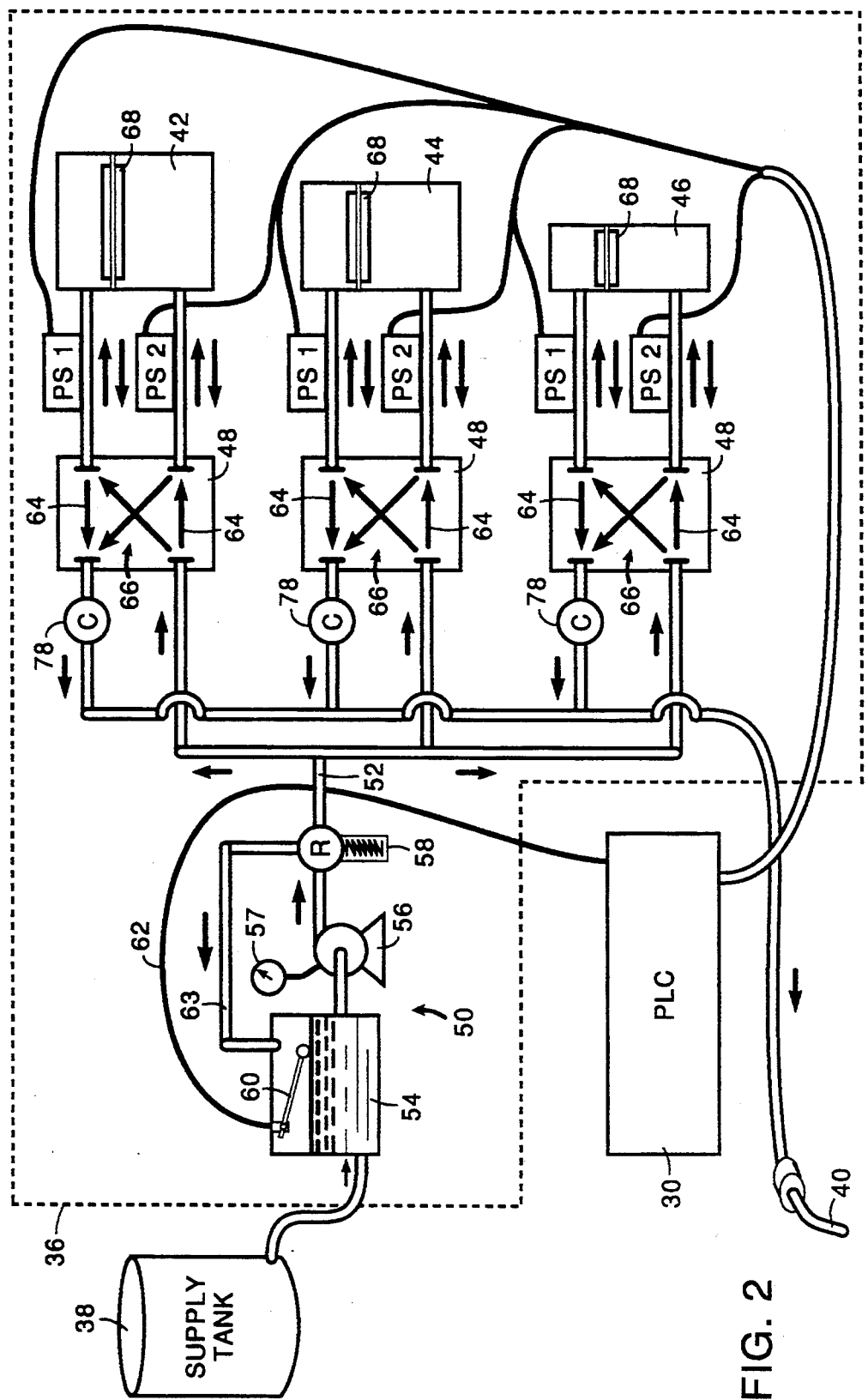
FIG. 2 is a schematic illustration of a pumping system of the inventive automated fluid charging apparatus.

The pumping system 36, shown in more detail in FIG. 2, generally includes a plurality of positive displacement cylinders, three such positive displacement cylinders, cylinder 42, cylinder 44, and cylinder 46, being shown in the preferred embodiment of FIG. 2, a "crossover" solenoid valve 48 associated with each of the positive displacement cylinders 42, 44, and 46, and a pressure regulation system 50 that is disposed in a supply line 52 between the supply tank 38 and the crossover solenoids 48.

The pressure regulation system 50, in turn, generally includes an intermediate holding tank 54, a pump 56, provided with a pressure gauge 57, and an adjustable release valve 58 positioned sequentially along the supply line 52. The holding tank 54 is provided with a float mechanism 60 connected to a signal line 62 that provides the programmable logic controller 30 with a signal if the float mechanism 60 drops to too low a level, indicating a problem, for example, that the supply of the fluid in the supply tank 38 has been exhausted. The adjustable release valve 58 is set for a desired supply pressure, and if this supply pressure is exceeded, excess fluid is returned to the holding tank 54 via a return line 63.

The combination of the plurality of positive displacement cylinders 42, 44, and 46 with their associated crossover solenoid valves 48 forms a unique apparatus for pumping under the control of the programmable logic controller 30. The crossover solenoid valves 48 are of the type well known to those in the hydraulic arts as "double acting two way solenoid valves," a typical example of such a solenoid valve being manufactured by the Parker Hannifin Corp. of Cleveland, Ohio. The present inventor has obtained good results utilizing a Parker Hannifin directional valve designated by the Model No. D3W1DY. Such solenoid valves allow the hydraulic engineer to direct flow in various directions according to conditions by actuating the solenoid valves via control signals. In the present case, the crossover solenoid valves 48 constitute double acting two way solenoid valves that are set up so as to direct the flow of the fluid supplied from the supply line 52 in two reciprocal flow paths, under the control of the programmable logic controller 30. The two reciprocal flow paths effected by the crossover solenoid valves 48 are indicated by directional flow arrows in FIGS. 2 and 3 and are referenced therein by the reference numerals 64 and 66.

Figure 3:
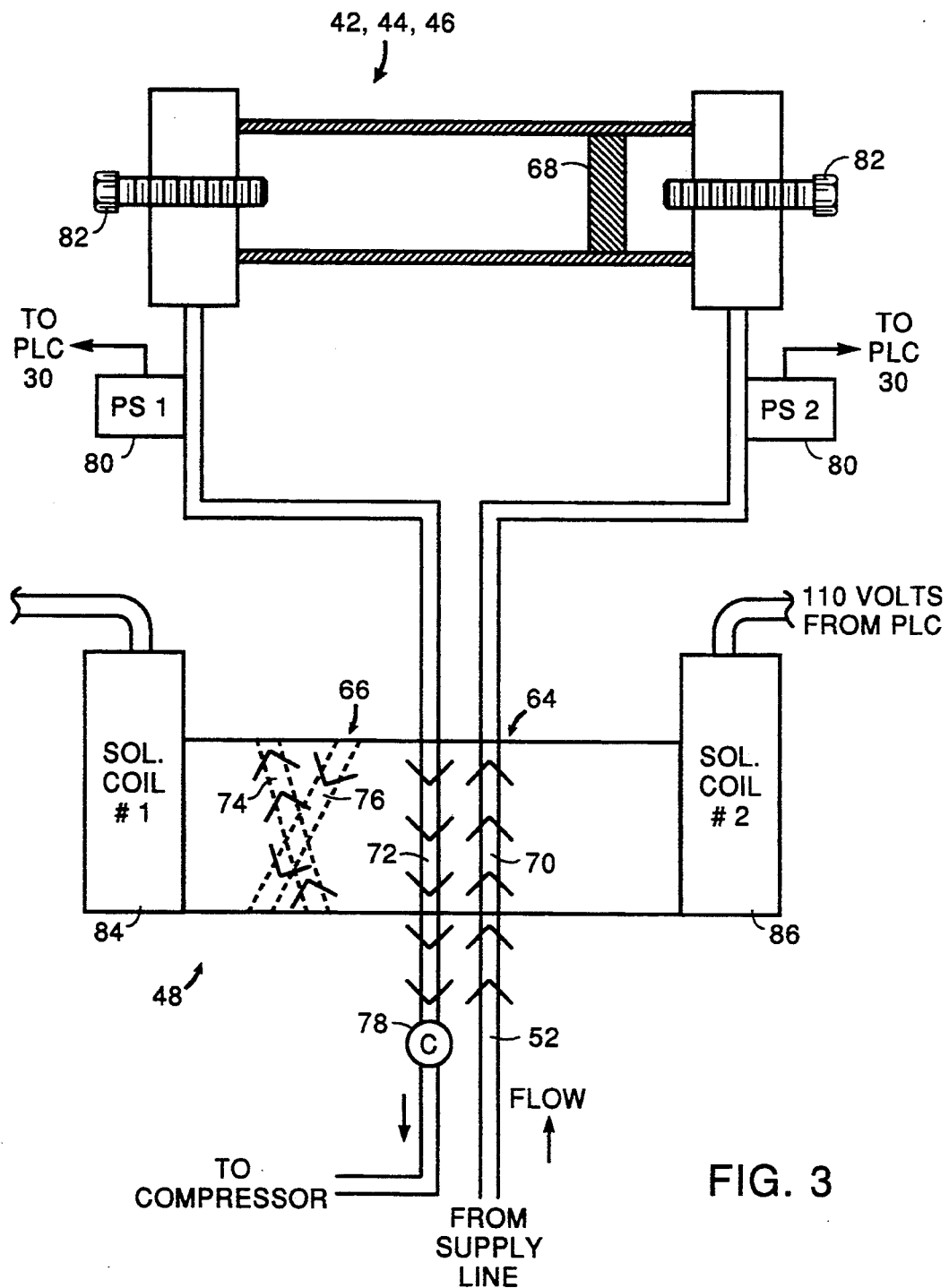
FIG. 3 is a schematic illustration of a positive displacement cylinder and an associated double acting two way solenoid used in the pumping system of FIG. 2.

Referring now to both of FIGS. 2 and 3, each of the positive displacement cylinders 42, 44, and 46 includes a piston 68 that executes a reciprocating motion within its respective cylinder. During a first stroke of the piston 68, the fluid follows the first flow path 64 wherein the fluid is supplied from the supply line 52 to each of the positive displacement cylinders 42, 44, and 46 along a first flow route 70, and wherein the fluid is delivered from each of the positive displacement cylinders 42, 44, and 46 to the delivery nozzle 40 along a second flow route 72. In contrast, during a second stroke of the piston 68, the second piston stroke being reciprocal (e.g., opposite in direction) to the first piston stroke, the fluid follows the second flow path 66, wherein the fluid is supplied from the supply line along an alternative first flow route 74, and wherein the fluid is delivered to the delivery nozzle 40 along an alternative second flow route 76. It will be seen, most particularly from an examination of FIG. 3, that the first and second flow paths 64 and 66 "cross over" and are reciprocal to one another, in the sense that, during the first stroke of the piston 68, the fluid is supplied behind a first face of the piston 68 and withdrawn from in front of the opposite second face of the piston 68, while during the second reciprocal stroke of the piston 68, the fluid is supplied behind the second face of the piston 68 and withdrawn from in front of the first face of the piston 68. The unique arrangement of the crossover solenoid valves 48, implemented as double acting two way solenoid valves, in combination with each of the positive displacement cylinders 42, 44, and 46 permits the pumping system 36 to deliver a measured volume of the fluid to the discharge nozzle 40 with each stroke of the pistons 68. Thus, the need for a separate intake and discharge stroke is eliminated, resulting in a more efficient and speedy delivery of the fluid to the discharge nozzle 40.

Each of the crossover solenoid valves 48 is preferably provided with a one way flow valve (or check valve) 78 in the effluent line that connects with the discharge nozzle 40, to positively prevent any backflow. Additionally, each of the two flow channels connecting each of the crossover solenoid valves 48 with its associated positive displacement cylinder 42, 44, and 46 is provided with a pressure sensor 80 (also indicated in the drawings as PS 1 and PS 2) that supplies a signal to the programmable logic controller 30 indicating whenever a pressure pulse occurs in the flow channels, and thereby allowing the programmable logic controller 30 to count the strokes executed by the pistons 68.

Each of the positive displacement cylinders 42, 44, and 46 preferably includes a pair of adjustment stops 82 that allow adjustment of the displacement strokes of the cylinders 42, 44, and 46 for delivery of varying amounts of the fluid during each stroke of the pistons 68. The positive displacement cylinders 42, 44, and 46 are preferably of different displacement capacities. The present inventor has obtained good results with use of positive displacement cylinders manufactured under the tradename of "Kleenseal Hydrameasure," most specifically those identified by the Model Numbers 81911, 82232, and 81741, and having displacement capacities of 50, 7.5, and 1.1 cubic inches, respectively.

Additionally shown in FIG. 3 is a pair of solenoid coils 84 and 86, positioned on opposite sides of each of the crossover solenoid valves 48, which are alternately energized by the programmable logic controller 30 to switch between the first and second flow paths 64 and 66.

The preferred mode of operation of the inventive automated fluid charging apparatus is as follows: With a component 26 that is to be charged (e.g., a remanufactured compressor that is to be filled with an appropriate volume of a lubricating oil) already in place on the scale 12, the operator depresses a button on the control panel 32 that produces identifying data corresponding to the particular component. The programmable logic controller 30 determines, according to previously entered logic well known in the art, the appropriate volume of oil to be discharged for the component identified and actuates the positive displacement cylinders in selected sequences of strokes to deliver the appropriate volume of the fluid to the discharge nozzle 40. For example, a particular component 26 could require four strokes of the largest cylinder 42, two strokes of the intermediate cylinder 44, and a single stroke of the smallest cylinder 46. During the pumping of the fluid, the crossover solenoids 48 are switched between the two reciprocal flow paths 64 and 66 by the programmable logic controller 30, such that the fluid is discharged during each stroke, and the programmable logic controller 30 receives feedback of each stroke executed via pressure pulses transmitted by the pressure sensors 80 (i.e., PS 1 and PS 2). Additionally, the cutoff module 28 having digital readouts provides an indication to the operator of the acceptable high and low weights of the filled component 26, that is the desired filled weight plus and minus an acceptable tolerance limit of overfill and underfill. If the programmable logic controller 30 determines that the component 26 has been properly filled, it opens the exit gate 16 via the servomotor 20, and the operator is able to move the filled component 26 therethrough, which activates the exit gate photosensor 24, causing the programmable logic controller to close the exit gate 16 and open the entrance gate 14 via the servomotor 18, allowing another component 26 to be moved onto the scale 12 by the operator. The passage of the entering component 26 activates the entrance gate photosensor 22, and the programmable logic controller 30 closes the entrance gate 14. This process is then repeated.

The present inventor has found that the apparatus described herein can be easily adapted to discharge different types of fluid as required by providing parallel pumping systems. For example, in a situation where different compressors are being filled with different volumes of two types of lubricating oil (e.g., oil of two different viscosities), two substantially parallel pumping systems 36 can be provided and controlled by a single programmable logic controller 30. In such case, the cutoff module 28 is preferably able to respond to two high and low tolerance limits corresponding to the two different fluids, as is shown in FIG. 1.

While the invention has been herein described by way of a particular preferred embodiment, various substitutions of equivalents may be effected without departing from the spirit and scope of the invention as set forth in the following claims.

What is claimed is:

1. A fluid charging system for charging each of a succession of components with a weight of a fluid, each of said components being charged with a respective selected fluid weight selected from a plurality of fluid weights, said fluid charging system comprising:
   a scale for weighing each of said components and for generating weight signals indicative of the weight of each of said components;
   identification means for generating identification signals identifying each of said components;
   a pumping system for charging each of said components with said respective selected fluid weight by delivering said respective selected fluid weights to said components;

said pumping system comprises a plurality of positive displacement cylinders of substantially differing and distinct capacities;

digital processing means for receiving said weight signals and said identification signals, for determining said respective selected fluid weight for each of said components from said plurality of fluid weights, and for actuating said pumping system to thereby cause said pumping system to deliver said respective selected fluid weights to said components; and said digital processing means comprises means for selectively actuating selected ones of said plurality of positive displacement cylinders to thereby deliver said respective selected fluid weights to said components.

2. A fluid charging system for charging each of a succession of components with a weight of a fluid, each of said components being charged with a respective selected fluid weight selected from a plurality of fluid weights, said fluid charging system comprising:

a scale for weighing each of said components and for generating weight signals indicative of the weight of each of said components;

identification means for generating identification signals identifying each of said components;

a pumping system for charging each of said components with said respective selected fluid weight by delivering said respective selected fluid weights to said components, said pumping system comprising:

a plurality of positive displacement cylinders of substantially differing and distinct capacities;

each of said plurality of positive displacement cylinders comprising a double acting positive displacement cylinder having a reciprocating piston member executing a first stroke and a substantially reciprocal second stroke, said reciprocating piston member being operative to deliver said fluid to said components during both of said first stroke and said substantially reciprocal second stroke; and a plurality of double acting two way solenoid valves, one each of said double acting two way solenoids being connected to one each of said double acting positive displacement cylinders, each of said double acting two way solenoids having a first fluid flow path and a second fluid flow path, said first and second flow paths being substantially reciprocal to one another; and digital processing means for receiving said weight signals and said identification signals and for determining said respective selected fluid weight for each of said components from said plurality of fluid weights;

said digital processing means comprising means for selectively actuating selected ones of said plurality of positive displacement cylinders to thereby produce said respective selected fluid weights.

3. A fluid charging system according to claim 2, wherein said pumping system additionally comprises:

fluid reservoir means for supplying a flow of said fluid to said plurality of double acting two way solenoids;

fluid discharge means for delivering said respective selected fluid weights from said plurality of double acting two way solenoids to said components; and pressure regulation means for maintaining a substantially constant pressure in said fluid supplied from said fluid reservoir means to said plurality of double acting two way solenoids.

4. A fluid charging system according to claim 3, wherein said fluid charging system additionally comprises:

conveyor means passing across said scale and defining a scale entrance area and a scale exit area;

first photosensor means positioned adjacent said scale entrance area, said first photosensor means transmitting a first photosensor signal to said digital processing means indicative that a component has passed said scale entrance area on said conveyor means;

second photosensor means positioned adjacent said scale exit area, said second photosensor means transmitting a second photosensor signal to said digital processing means indicative that a component has passed said scale exit area on said conveyor means;

a scale entrance gate positioned at said scale entrance area and operable between open and closed positions; and a scale exit gate positioned at said scale exit gate area and operable between open and closed positions;

and wherein said digital processing means additionally comprises means for operating said scale entrance and exit gates responsive to said first and second photosensor signals.

5. A fluid charging system according to claim 4, wherein said identification means comprises a control panel having data entry means operable by an operator to generate said identification signals.

6. A fluid charging system according to claim 4, wherein said identification means comprises a bar code reader.

7. A fluid charging system according to claim 3, wherein said plurality of positive displacement cylinders comprises three positive displacement cylinders having displacement volumes of 1.1, 7.5, and 50 cubic inches.

8. A fluid charging system according to claim 7, wherein each of said plurality of positive displacement cylinders is provided with adjustment means for adjusting the displacement volume thereof.

9. A fluid charging system for charging each of a succession of components with a weight of a fluid, each of said components being charged with a respective selected fluid weight selected from a plurality of fluid weights, said fluid charging system comprising:

a scale for weighing each of said components and for generating weight signals indicative of the weight of each of said components;

identification means for generating identification signals identifying each of said components;

a pumping system for charging each of said components with said respective selected fluid weight by delivering said respective selected fluid weights to said components, said pumping system comprising:

a plurality of positive displacement cylinders of substantially differing and distinct capacities;

each of said plurality of positive displacement cylinders comprising a double acting positive displacement cylinder having a reciprocating piston member executing a first stroke and a substantially reciprocal second stroke, said reciprocating piston member being operative to deliver said fluid to said components during both of said first stroke and said substantially reciprocal second stroke; and a plurality of double acting two way solenoid valves, one each of said double acting two way solenoids being connected to one each of said double acting positive displacement cylinders, each of said double acting two way solenoids having a first fluid flow path and a second fluid flow path, said first and second flow paths being substantially reciprocal to one another;

each of said positive displacement cylinders comprising:

a piston cylinder, said reciprocating piston member being positioned within said piston cylinder;

a first fluid passage disposed at a first end of said piston cylinder adjacent a first terminating point of said first stroke of said piston, said first fluid passage communicating with said connected double acting two way solenoid; and a second fluid passage disposed at a second end of said piston cylinder adjacent a second terminating point of said second reciprocal stroke of said piston, said second fluid passage also communicating with said connected double acting two way solenoid;

a first pressure sensor positioned on said first fluid passage for detecting a first pressure pulse therein; and a second pressure sensor positioned on said second fluid passage for detecting a second pressure pulse therein; and digital processing means for receiving said weight signals and said identification signals and for determining said respective selected fluid weight for each of said components from said plurality of fluid weights;

said digital processing means comprising means for selectively actuating selected ones of said plurality of positive displacement cylinders to thereby produce said respective selected fluid weights, and counting means for counting said first and second pressure pulses.

10. A fluid charging system according to claim 9, wherein said pumping system additionally comprises:

fluid reservoir means for supplying a flow of said fluid to said plurality of double acting two way solenoids;

fluid discharge means for delivering said respective selected fluid weights from said plurality of double acting two way solenoids to said components; and pressure regulation means for maintaining a substantially constant pressure in said fluid supplied from said fluid reservoir means to said plurality of double acting two way solenoids.

11. A fluid charging system according to claim 10, wherein said fluid charging system additionally comprises:

conveyor means passing across said scale and defining a scale entrance area and a scale exit area;

first photosensor means positioned adjacent said scale entrance area, said first photosensor means transmitting a first photosensor signal to said digital processing means indicative that a component has passed said scale entrance area on said conveyor means;

second photosensor means positioned adjacent said scale exit area, said second photosensor means transmitting a second photosensor signal to said digital processing means indicative that a component has passed said scale exit area on said conveyor means;

a scale entrance gate positioned at said scale entrance area and operable between open and closed positions; and a scale exit gate positioned at said scale exit gate area and operable between open and closed positions;

and wherein said digital processing means additionally comprises means for operating said scale entrance and exit gates responsive to said first and second photosensor signals.

12. A fluid charging system according to claim 11, wherein said identification means comprises a control panel having data entry means operable by an operator to generate said identification signals.

13. A fluid charging system according to claim 11, wherein said identification means comprises a bar code reader.

14. A fluid charging system according to claim 11, wherein said plurality of positive displacement cylinders comprises three positive displacement cylinders having displacement volumes of 1.1, 7.5, and 50 cubic inches.

15. A fluid charging system according to claim 14, wherein each of said plurality of positive displacement cylinders is provided with adjustment means for adjusting the displacement volume thereof.

* * * * *